US009398223B2

(12) United States Patent
Penn et al.

(10) Patent No.: US 9,398,223 B2
(45) Date of Patent: Jul. 19, 2016

(54) SHARED-FIELD IMAGE PROJECTION AND CAPTURE SYSTEM

(71) Applicant: Texas Instruments Incorporated, Dallas, TX (US)

(72) Inventors: Steven M. Penn, Plano, TX (US); Duane S. Dewald, Dallas, TX (US); Matthew G. Hine, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/248,047

(22) Filed: Apr. 8, 2014

(65) Prior Publication Data

US 2014/0240573 A1 Aug. 28, 2014

Related U.S. Application Data

(63) Continuation of application No. 12/334,240, filed on Dec. 12, 2008, now Pat. No. 8,690,340.

(51) Int. Cl.
*H01J 3/14* (2006.01)
*G01J 3/50* (2006.01)
*H01L 27/00* (2006.01)
*H04N 5/232* (2006.01)
*G06F 3/042* (2006.01)
*G03B 21/10* (2006.01)
*G03B 17/54* (2006.01)

(52) U.S. Cl.
CPC ............ *H04N 5/23293* (2013.01); *G03B 17/54* (2013.01); *G03B 21/10* (2013.01); *G06F 3/0425* (2013.01)

(58) Field of Classification Search
CPC . G06F 3/033; G06F 3/03542; G06F 3/03545; G06F 3/03546; G06F 3/03547; G06F 3/037; G06F 3/038; G06F 3/0383; G06F 3/0386; G06F 3/041; G06F 3/0412; G06F 3/0414; G06F 3/0416; G06F 3/0418; G06F 3/042; G06F 3/0421; G06F 3/0425; G06F 3/0426; G06F 3/0428; G06F 3/046
USPC .............. 250/208.1; 345/173, 175, 176, 179, 345/180–183; 348/744, 750, 751, 758, 759, 348/760, 761, 766, 770, 771; 359/196.1, 359/201.2, 237, 245, 263
See application file for complete search history.

(56) References Cited

U.S. PATENT DOCUMENTS

| 5,612,736 A * | 3/1997 | Vogeley et al. ........... 348/207.99 |
| 7,525,538 B2 * | 4/2009 | Bathiche ........................ 345/175 |
| 2007/0040921 A1 * | 2/2007 | Davis et al. .................... 348/305 |

* cited by examiner

*Primary Examiner* — Pascal M Bui Pho
(74) *Attorney, Agent, or Firm* — Daniel Chan; Frank D. Cimino

(57) ABSTRACT

According to one embodiment of the present invention a method for capturing images on a screen is disclosed. The method includes directing light from a surface of a spatial light modular to an image field using a projection system; capturing light from the image field using the projection system, the projection system directing at least a portion of the captured light to the spatial light modulator; and directing at least a portion of the received captured light to an image capture system using the spatial light modulator.

10 Claims, 3 Drawing Sheets

SHARED-FIELD IMAGE PROJECTION AND CAPTURE SYSTEM

This is a continuation of application Ser. No. 12/334,240 filed Dec. 12, 2008 (now U.S. Pat. No. 8,690,340), the entirety of which is incorporated herein by reference.

TECHNICAL FIELD

This invention relates in general to a combined image projection and image capture system and method.

BACKGROUND

Image projection systems often involve directing light towards a display such that an image is produced. One way of effecting such an image is through the use of spatial light modulators such as digital micromirror devices (DMD) available from Texas Instruments. With DMD display systems, in general, light is directed through a lens array to a DMD array having numerous micromirrors. Each micromirror is selectively controlled to reflect the light towards a particular portion of a display, such as a pixel. The angle of a micromirror can be changed to switch a pixel to an "on" or "off" state. The micromirrors can maintain their "on" or "off" state for controlled display times.

Image capture systems, in general, often involve camera systems that include one or more sources of light, lenses, light sensors or detectors, and processing technology for detecting and processing the image. The image can be formed on a surface or screen.

Light processing systems can be enhanced with the addition of the ability to capture an image at the same surface on which an image is projected. Combining a light processing system with an image detection and capture system can involve additional optical and electronic components that can be difficult to align, costly, and of unpredictable performance.

SUMMARY

According to one embodiment of the present invention a method for displaying and capturing images on a screen is disclosed. The method includes directing light from a surface of a spatial light modular to an image field using a projection system; capturing light from the image field using the projection system, the projection system directing at least a portion of the captured light to the spatial light modulator; and directing at least a portion of the received captured light to an image capture system using the spatial light modulator.

In another embodiment, an image display and capture system is disclosed. The system includes a spatial light modulator comprising a surface positioned to direct light to a projection system; the projection system positioned to direct light from the spatial light modulator to an image field; the projection system also positioned to capture light from the image field and direct at least a portion of the captured light to the spatial light modulator; and the spatial light modulator also positioned to direct at least a portion of the received captured light to an image capture system.

Certain embodiments may provide a number of technical advantages. For example, a technical advantage of one embodiment may include increased system efficiency and lower power usage. Other technical advantages of other embodiments may include faster and more accurate interaction detection.

Although specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

It should be understood at the outset that although example implementations of embodiments of the invention are illustrated below, the present invention may be implemented using any number of techniques, whether currently known or in existence. The present invention should in no way be limited to the example implementations, drawings, and techniques illustrated below. Additionally, the drawings are not necessarily drawn to scale and do not necessarily contain all optical elements related Image display systems can be combined with image capturing systems to facilitate systems that allow interaction with displayed images. These systems can include spatial light modulators such as a digital micromirror device or DMD. A DMD is a micro electro-mechanical device comprising an array of hundreds of thousands of tilting digital micromirrors. From their flat or resting state, the micromirrors may be actively tilted, for example, to a positive or negative angle corresponding to an "on" state and an "off" state. Light from a light source is directed to the DMD's "active area" whereupon it is reflected off the DMD's micromirrors to An image field for displaying images. Combined systems can also include various components for facilitating image capture and display interaction discussed more fully below.

Figure 1A:
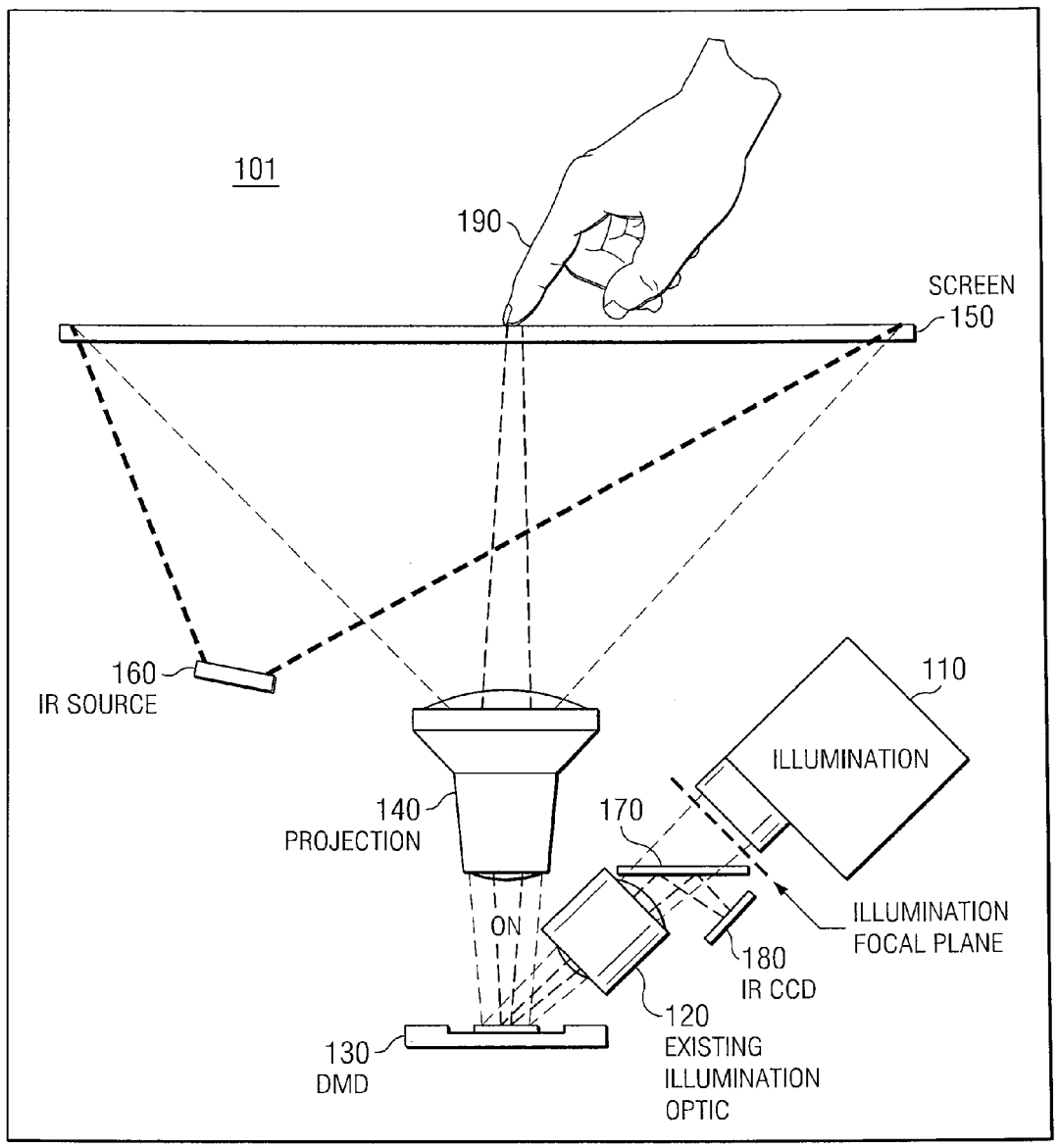
FIG. 1A is a diagram of a portion of a combined image display and capture system.

FIG. 1A is a diagram of one embodiment of a portion of a combined display and image capture system 101. In this example, system 101 includes a light source 110, a reflecting lens 170, an illumination optic 120, a digital micro mirror device 130, a projection system 140, a screen 150, an infrared light source 160, a reflecting lens, and an infrared CCD 180. CCD stands for charge coupled device and can be used for capturing images reflected on its photo active region in a variety of electromagnetic spectrums, particularly visible light and infrared light. CCDs are well known in the art. In addition to CCDs, any type of image capture device known in the art may be used such as CMOS or other light sensors such as photodiodes. DMD 130 is but one example of a spatial light modulator that can be used and any of a number of spatial light modulators may be used. DMDs may offer better response times compared to other spatial light modulators. Light source 110 includes one or more lenses, LEDs, lasers, ambient light sources or other light sources for generating and focusing an illumination light beam. Light source 110 can include any suitable number of light sources appropriate for generating light for transmission to DMD 130. Projection system 140 can include one or more lenses and lens support structures for focusing and projecting light from the DMD to the screen 150. Screen 150 can be any image field. It may be made of a number of known transparent or semitransparent materials of flat or non flat surfaces for the display of images and video in a projection system. Infrared light source 160 can include any of numerous known infrared light projection devices and systems. In addition, light source 160 can also be any source of light, such as visible light or any other spectrum of light. Ambient light may also be used in addition to light from a light pen. Reflecting lens, or dichroic filter, 170, placed between light source 100 and illumination optic 120, can be made of a variety of known materials. Reflecting lens 170 can filter visible and infrared light in such a way as to allow visible light from light source 110 to pass through it to the illumination optic 120 while allowing infrared light to reflect from the DMD 130 to the CCD 180. Instead of an infrared dichroic, other dichroics or a partially reflective mirror could also be used to capture different wavelengths of light, including color. Likewise, instead of an infrared light source 160 and infrared CCD 180, light sources and CCDs or image capture devices for light at other frequencies or wavelengths may be used.

When system 101 operates, light source 110 directs visible light through the reflective mirror 170 to existing illumination object 120 to the active area of DMD 130. The micromirrors on the active area of the DMD 130 create an image and reflect that image through the projection system 140 during the on state of the DMD. Projection system 140 projects the image from the DMD on to the screen 150. In this manner, system 100 displays images and/or video on screen 150. In addition, the combined image display and capture system 100 includes elements that allow for the capturing of images on screen 150. System 100 can include infrared light source 160 that projects infrared light on to screen 150. This infrared light is reflected off the screen 150 into the projection system 140. Projection system 140 directs the infrared light to the DMD 130. DMD 130 directs the infrared light through the existing illumination optic 120. Reflecting lens 170 is placed between the illumination optic 120 and the CCD 180, such that a CCD 180 receives reflected light from the lens 170 to capture an image of the screen 150. CCD 180 subsequently takes the infrared light it receives from the reflecting lens 170 and captures the infrared image on the screen 150. It should be noted that CCD 180 is but one example of an image capture sensor. Other image capture sensors well known in the art may be used including photodiodes, infrared sensors, and visible light sensors. In this manner, images can both be displayed on to screen 150 and captured from screen 150. In the event a color image is to be captured, it may be desirable to capture an image during a short duration of time with the DMD blanked in order capture an image without interference with projected light.

The image capture capability of system 101 can facilitate interactions with the displayed images. FIG. 1A shows interaction 190 with screen 150. In the case of infrared image capture, infrared light, or heat, from an interaction 190 or reflected by interaction 190, such as a human finger, is passed from screen 150 to the CCD 180 in the manner discussed above. Interactions 190 with the screen 150 can be detected using known signal processing methods whereby the infrared signature or pattern of the interaction can be detected from the image captured on the CCD 180. In addition to the location of the interaction, the size and the shape of the interaction can also be detected using signal processing algorithms by a signal processing system connected to CCD 180 (not shown).

In addition, the infrared image captured by infrared CCD 180 can be combined with information of the visible light image projected on to screen 140. This information can be combined to determine the location of interaction 180 with screen 140, the size of the interaction, the shape of the interaction, and the duration of the interaction. The infrared image of screen 140 and the visible light image of screen 140, already known by the signal processing system in order to display the content, can also be combined to manipulate the projected visible light image, for instance to sharpen the image or add color.

Figure 1B:
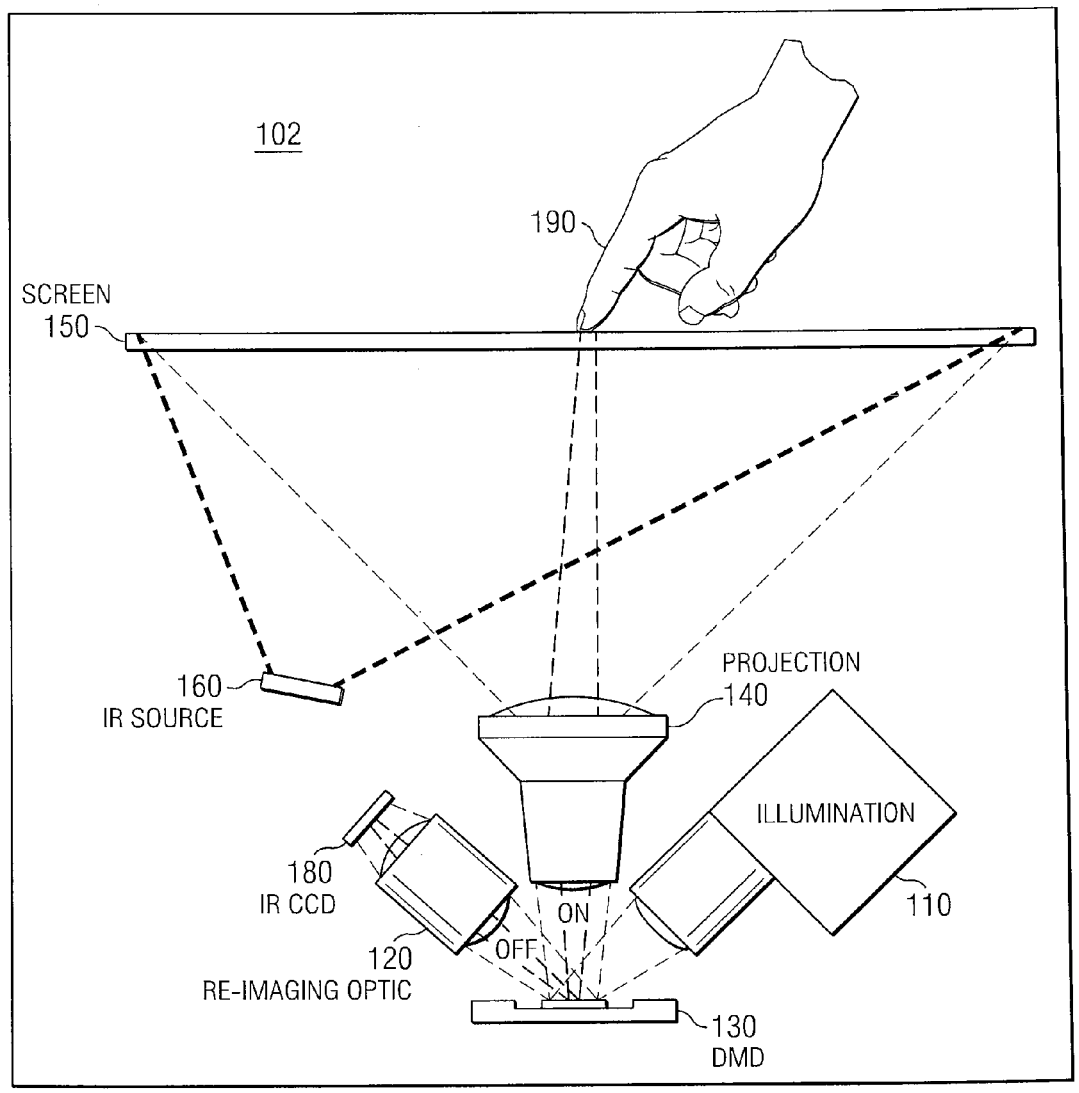
FIG. 1B is a diagram of a portion of a combined image display and capture system.

In another embodiment shown in FIG. 1B, a reimaging optic 120 is used to capture a focused image of the screen 150 reflected from DMD 130. In this embodiment, the DMD 130 directs the infrared image of screen 150 to reimaging optic 120 during the DMD's "off" state, while the DMD is not reflecting a visible light image on screen 150. Instead, in the off state, the micromirrors of DMD 130 reflect the infrared image of screen 150 to the reimaging optic 120 and onto infrared CCD 180. The off state can occur at various intervals dictated by system needs and can be arranged so that no detectable interruption to the displayed image on screen 150 is detectable to the eye. In this embodiment, interaction facilitation and image processing would operate in the same manner as discussed above in reference to FIG. 1A.

In addition, in each of the embodiments discussed with respect to FIGS. 1A-1B, the light source can also be in front of the screen 150 in the form of a light pen projecting infrared light onto screen 150. Interaction with screen 150 is achieved by directing light from a light pen to various portions of screen 150 and directing that light ultimately to a CCD or image capture system in the manner discussed in detail above.

In some embodiments, an optical processor can determine that an interaction is occurring at the location of the screen associated with the area of the DMD or spatial light modulator directed to the image capture system. In such arrangements, only portions of the spatial light modulator are directed to the image capture system at a time. This can allow the system to localize targets on the surface of the screen using a variety of two-dimensional search algorithms.

In other embodiments, an interaction is detected in the following manner. The DMD will direct known areas of the DMD associated with areas of screen to the image capture system. For instance, one or more micromirrors on the DMD will direct light to the image capture system. These micromirrors are associated with areas of screen. When the image capture system detects light above a predetermined threshold, an optical processor can determine that an interaction is occurring at the location of the screen associated with the area of the DMD directed to the image capture system. This can allow the system to localize targets on the surface of the screen using a variety of known two-dimensional search algorithms.

Figure 2A:
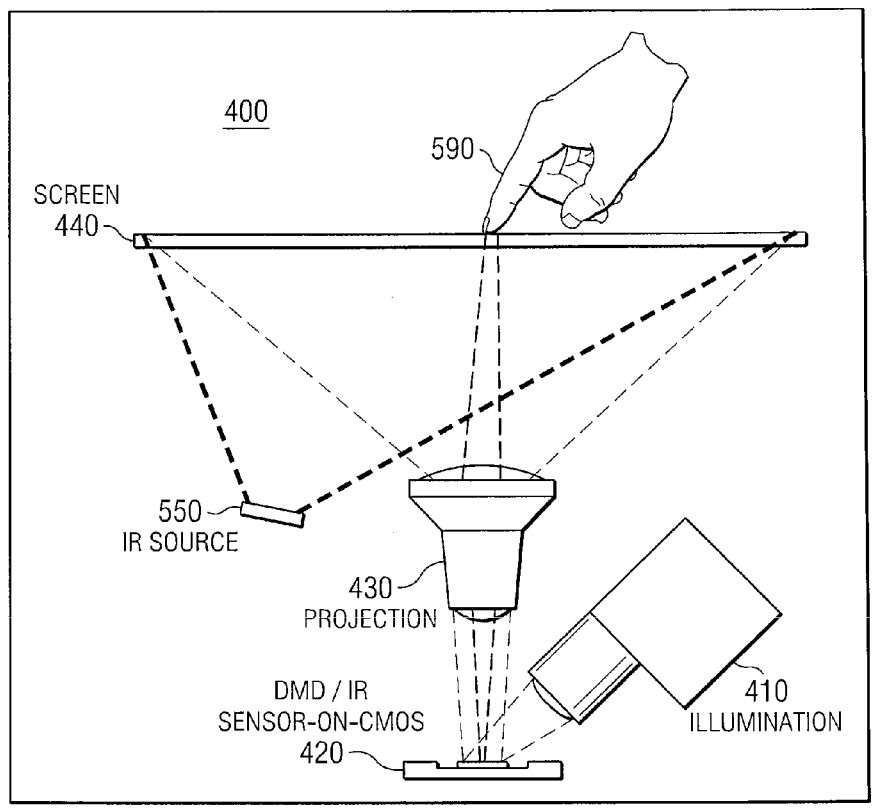
FIG. 2A is a diagram of a portion of a combined image display and capture system.

In another embodiment in reference to FIG. 2A, combined system 400 is shown. System 400 projects images and video to screen 440 in the manner described above with respect to FIGS. 1A-2A. The image capture system of system 400 includes infrared light source 450 projecting infrared light to screen 440. The infrared light reflected off of screen 440 and directed to projection system 430 includes infrared light from interaction 490 with the screen. Projection system 430 directs the infrared light from screen 440 to the combined DMD and infrared sensor or CCD on CMOS 420.

Figure 2B:
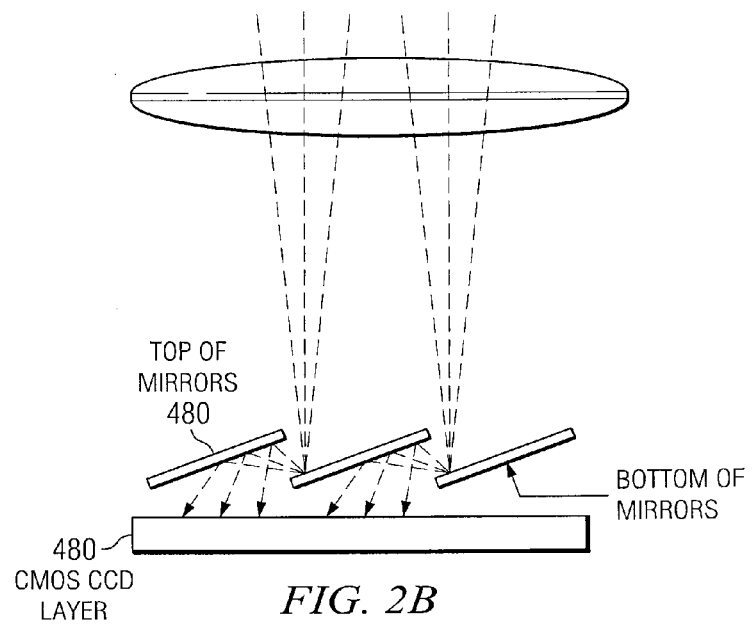
FIG. 2B is a diagram of a portion of a combined image display and capture system.

FIG. 2B shows the details of combined DMD infrared sensor 420. DMD 420 includes digital micromirrors 470 and CMOS CCD or infrared sensor 480 located on a CMOS layer beneath the micromirrors 470. Infrared light is directed on to the CCD layer 480 by first reflecting off the front surface of the micromirrors followed by reflecting off the bottom surface of the micromirrors and finally arriving to the surface of the CCD layer 480. The CCD or infrared sensor 480 can be used to capture the infrared image on screen 440 as discussed with other embodiments above. In embodiments where an infrared sensor 480 is used in system 400, the interaction detection and information system described with respect to FIGS. 2 and 3 may be used. In embodiments where a CCD 480 is used in system 400, the interaction detection and information system described with respect to FIG. 1A-1C may be used.

The combined image display and capture systems of the present invention may employ all, some, or none of the features or components discussed and illustrated in FIGS. 1-4.

Numerous other changes, substitutions, variations, alterations, and modifications may be ascertained to one skilled in the art and it is intended that the present invention encompass all such changes, substitutions, variations, alterations, and modifications as falling within the scope of the appended claims. For example, it will be understood that although a particular embodiment may show an infrared light source and sensor, other lights sources and sensors for other electromagnetic frequencies may be used.

What is claimed is:

1. An image display and capture system comprising:
a visible light source configured to generate visible light;
a spatial light modulator positioned to redirect the visible light received from the visible light source;
an infrared light source configured to direct infrared light to a screen;
a projection system positioned to direct the visible light from the spatial light modulator to the screen and direct the infrared light reflected from the screen to the spatial light modulator; and
a single dichroic filter positioned between the visible light source and the spatial light modulator to pass the visible light from the visible light source to the spatial light modulator and reflect the infrared light from the spatial light modulator to an infrared capturing device.

2. The system of claim 1 wherein the spatial light modulator is a digital micromirror (DMD) device.

3. The system of claim 2 wherein the DMD directs the infrared light from the projection system in an off state of the DMD.

4. The system of claim 1, further comprising an image capture system located beneath an array of reflecting surfaces in a CMOS layer of the DMD.

5. A method for image display and capture comprising:
directing visible light from a visible light source to a spatial light modulator through a single dichroic filter positioned between the spatial light modulator and the visible light source;
directing the visible light from the spatial light modulator to an image field using a projection system;
directing infrared light from an infrared light source to the image field;
capturing the infrared light reflected from the image field using the projection system;
directing the captured infrared light to the spatial light modulator using the projection system;
directing the captured infrared light to the single dichroic filter using the spatial light modulator; and
reflecting the directed infrared light to an image capture system using the single dichroic filter.

6. The method of claim 5 wherein the spatial light modulator is a digital micromirror (DMD) device.

7. The method of claim 5 wherein the image capture system comprises a detection device selected from a group consisting of a CCD, a CMOS, an infrared sensor, a photodiode, and combinations thereof.

8. The method of claim 5, further comprising:
directing the captured infrared light to the image capture system while the spatial light modulator is in an off state.

9. An image display and capture system comprising:
a visible light source configured to generate visible light;
a spatial light modulator positioned to redirect the visible light received from the visible light source;
an infrared light source configured to direct infrared light to a screen;
a projection system positioned to direct the visible light from the spatial light modulator to the screen and direct the infrared light reflected from the screen to the spatial light modulator; and
a single dichroic filter positioned between and longitudinally aligned with the visible light source and the spatial light modulator to pass the visible light from the visible light source to the spatial light modulator and reflect the infrared light from the spatial light modulator to an infrared capturing device.

10. An image display and capture system comprising:
a visible light source configured to generate visible light;
a spatial light modulator positioned to redirect the visible light received from the visible light source;
an infrared light source configured to direct infrared light to a screen;
a projection system positioned to direct the visible light from the spatial light modulator to the screen and direct the infrared light reflected from the screen to the spatial light modulator; and
a dichroic filter positioned between the visible light source and the spatial light modulator, the dichroic filter having a first surface and a second surface opposing the first surface, the first surface configured to receive the visible light from the visible light source, and the second surface configured to transmit the received visible light to the spatial light modulator and reflect the infrared light from the spatial light modulator to an infrared capturing device.

* * * * *